United States Patent
Zhang et al.

(10) Patent No.: US 8,851,601 B2
(45) Date of Patent: **\*Oct. 7, 2014**

(54) SYSTEM AND METHOD FOR COMPENSATING FOR DRIFT IN MULTIPLE PRINTHEADS IN AN INKJET PRINTER

(75) Inventors: Yeqing Zhang, Penfield, NY (US); Jeffrey J. Folkins, Rochester, NY (US); Alex S. Brougham, Webster, NY (US)

(73) Assignee: Xerox Corporation, Norwalk, CT (US)

( \* ) Notice: Subject to any disclaimer, the term of this patent is extended or adjusted under 35 U.S.C. 154(b) by 171 days.

This patent is subject to a terminal disclaimer.

(21) Appl. No.: 13/368,204

(22) Filed: Feb. 7, 2012

(65) Prior Publication Data

US 2013/0201233 A1 Aug. 8, 2013

(51) Int. Cl.
*B41J 29/38* (2006.01)

(52) U.S. Cl.
USPC ......... 347/10; 347/9; 347/11; 347/14; 347/19

(58) Field of Classification Search
CPC ....................................................... B41J 29/38
See application file for complete search history.

(56) References Cited

U.S. PATENT DOCUMENTS

| | | | |
|---|---|---|---|
| 5,343,231 A | 8/1994 | Suzuki | |
| 5,519,419 A | 5/1996 | Stephany et al. | |
| 5,724,259 A | 3/1998 | Seymour et al. | |
| 6,147,698 A | 11/2000 | Zable et al. | |
| 6,312,078 B1 | 11/2001 | Wen | |
| 6,318,831 B1 | 11/2001 | Baker | |
| 6,736,478 B2 | 5/2004 | Franzke et al. | |
| 6,775,029 B1 | 8/2004 | Wen et al. | |
| 6,832,824 B1 | 12/2004 | Baker et al. | |
| 6,883,892 B2 | 4/2005 | Sievert et al. | |
| 7,008,036 B2 | 3/2006 | Ju et al. | |
| 7,073,883 B2 | 7/2006 | Billow | |
| 7,123,850 B1 | 10/2006 | Hamby et al. | |
| 7,255,417 B2 | 8/2007 | Yamazaki et al. | |
| 7,364,274 B2 | 4/2008 | Kawabata et al. | |
| 7,374,266 B2 | 5/2008 | Walmsley et al. | |
| 7,380,898 B2 | 6/2008 | Plante et al. | |
| 7,393,072 B2 | 7/2008 | Lim et al. | |
| 7,556,337 B2 | 7/2009 | Snyder | |
| 7,585,044 B2 | 9/2009 | Williams et al. | |
| 7,712,854 B2 | 5/2010 | Ou et al. | |
| 7,760,397 B2 | 7/2010 | Hosier | |
| 7,766,447 B2 | 8/2010 | Snyder et al. | |
| 7,854,490 B2 | 12/2010 | Snyder | |
| 8,075,084 B2 \* | 12/2011 | Ossman et al. | ............. 347/19 |
| 2003/0210926 A1 | 11/2003 | Regimbal et al. | |
| 2004/0090482 A1 | 5/2004 | Lapstun et al. | |
| 2005/0073697 A1 | 4/2005 | Silverbrook et al. | |
| 2005/0083364 A1 | 4/2005 | Billow | |
| 2008/0278531 A1 | 11/2008 | Ikeda et al. | |

(Continued)

*Primary Examiner* — Manish S Shah
*Assistant Examiner* — Jeremy Delozier
(74) *Attorney, Agent, or Firm* — Maginot, Moore & Beck, LLP (57) ABSTRACT

A method for calibrating in situ a plurality of printheads in an imaging device has been developed. Firing signals operate a plurality of printheads to form ink test patterns on an image receiving member. Reflectance measurements of light reflected from the test patterns and optical density measurements for a portion of the patterns formed by only one printhead in the plurality of printheads are used to adjust the firing signals and enable the printheads to print within a predetermined range about an average reflectance value and a predetermined optical density.

23 Claims, 6 Drawing Sheets

(56) References Cited

U.S. PATENT DOCUMENTS

| | | |
|---|---|---|
| 2009/0027433 A1 | 1/2009 | Van De Wynckel et al. |
| 2009/0231375 A1* | 9/2009 | Folkins et al. .................. 347/14 |
| 2010/0232652 A1* | 9/2010 | Yeh et al. ...................... 382/112 |
| 2010/0259573 A1 | 10/2010 | Viturro et al. |
| 2011/0063355 A1* | 3/2011 | Eun et al. ........................ 347/16 |
| 2011/0063357 A1* | 3/2011 | Eun et al. ........................ 347/17 |
| 2011/0063359 A1* | 3/2011 | Buchar et al. ................... 347/19 |
| 2013/0038657 A1* | 2/2013 | Viturro et al. ................... 347/19 |

* cited by examiner

SYSTEM AND METHOD FOR COMPENSATING FOR DRIFT IN MULTIPLE PRINTHEADS IN AN INKJET PRINTER

TECHNICAL FIELD

This disclosure relates generally to compensating for actuator changes in printheads that occur over time from thermal and other conditions, and, more particularly, to adjustments to the operation of ink ejectors in one or more printheads to produce images with uniform optical densities.

BACKGROUND

Inkjet printers have printheads that operate a plurality of inkjets to eject liquid ink onto an image receiving member. The ink may be stored in reservoirs located within cartridges installed in the printer. Various forms of ink include aqueous, aqueous latex, oil, solvent-based, UV curable inks, or ink emulsions. Other inkjet printers receive ink in a solid form and then melt the solid ink to generate liquid ink for ejection onto the imaging member. In these solid ink printers, the solid ink may be pellets, ink sticks, granules, pastilles, or other forms. The solid ink pellets or ink sticks are typically placed in an ink loader and delivered through a feed chute or channel to a melting device that melts the ink. The melted ink is then collected in a reservoir and supplied to one or more printheads through a conduit or the like. In other inkjet printers, ink may be supplied in a gel form. The gel is also heated to a predetermined temperature to alter the viscosity of the ink so the ink is suitable for ejection by a printhead.

A typical full width inkjet printer uses one or more printheads. Each printhead typically contains an array of individual inkjet ejectors for ejecting drops of ink across an open gap to an image receiving member to form an image. The image receiving member may be a continuous web of recording media, a series of media sheets, or the image receiving member may be a rotating surface, such as a print drum or endless belt. Images printed on a rotating surface are later transferred to recording media by mechanical force generated in a transfix nip that is formed by the rotating surface and a transfix roller. In an inkjet printhead, individual piezoelectric, thermal, or acoustic actuators generate mechanical forces that expel ink from a pressure chamber through an orifice in response to an electrical signal, also referred to as a firing signal. The amplitudes, or voltage levels, of the firing signals affect the amount of ink ejected in each drop. The firing signal is generated by a printhead controller in accordance with image data and the firing signal parameters downloaded to the printhead controller. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the colors of printed images to correspond closely to the image data, the ink drops ejected onto the media for each ink color should form uniform colors for a given density of the color as specified in the image data. For example, if a region of a media sheet includes a region where 50% of the surface of the sheet should be covered in yellow ink, then the resulting ink image should appear to have a uniform yellow color in the specified region. To achieve the uniform color, the average sizes and masses of individual ink drops that form the ink image should be substantially uniform.

Although known calibration techniques enable initial firing signal parameters to be identified for operating the printheads in the printer to produce uniform colors, the environmental conditions, such as thermal conditions, in most printers eventually affect the actuators in the printheads. Specifically, the actuators begin to degrade, shift, or drift so they no longer eject the same mass of ink that they ejected in response to firing signals generated with reference to the initial firing signal parameters. To compensate for this variation, empirical data have been used to formulate a generic drift curve that identifies a change in a firing signal parameter with some parameter, such as the amount of time a printhead is exposed to temperatures in a predetermined range. Then, the time of such thermal exposure is monitored for each printhead and when a printhead accumulates a period of thermal exposure that noticeably affects the mass of the ink ejected by a printhead, one or more firing signal parameters are adjusted by an empirically determined change value or values. These empirically determined change values, which typically increase a firing signal parameter, operate the actuators in the printhead to eject ink masses that are in an acceptable range about the initial ink drop mass.

While this known technique can be effective, it sometimes fails to bring all printheads in a printer within the acceptable range. This failure is attributed to variances in the printheads. For example, all printheads do not follow the empirically determined thermal drift curve. Consequently, adjusting firing signal parameters for one printhead may overcompensate for changes that have occurred in the printhead performance, while the same adjustment for another printhead may undercompensate for changes in that printhead's performance. Thus, techniques that better adjust printhead parameters while maintaining uniform ink drop mass are desirable.

SUMMARY

In one embodiment, a method for adjusting printhead operation in a printer to maintain uniform color printing has been developed. The method includes adjusting with reference to empirically determined data at least one firing signal parameter for each printhead in a plurality of printheads, each printhead in the plurality of printheads ejecting a first color of ink only, and further adjusting the at least one firing signal parameter with reference to an optical density identified for each printhead in the plurality of printheads, each optical density being identified from image data of a test pattern formed on an image receiving member surface by the printheads in the plurality of printheads after the adjustment of the at least one firing signal parameter was made with reference to the empirically determined data.

In another embodiment, a printer has been configured to adjust operation of printheads in the printer to maintain uniform color printing. The printer includes a media transport configured to move an image receiving member through a print zone in a process direction, a plurality of heated printheads arranged in the print zone to enable printing with a single color of phase change ink across the image receiving member in a cross-process direction, an optical sensor located in the process direction from the plurality of heated printheads in the print zone, the optical sensor being configured to generate signals corresponding to light reflected from ink drops ejected onto the image receiving member by the plurality of heated printheads, and a controller operatively connected to the plurality of heated printheads and the optical sensor, the controller being configured to: adjust with reference to empirically determined data at least one firing signal parameter for each heated printhead in the plurality of heated printheads, operate the plurality of printheads to form a test pattern on an image receiving member surface after the adjustment of the at least one firing signal parameter was made with reference to the empirically determined data, and further adjusting the at least one firing signal parameter with reference to an optical density identified for each heated printhead in the plurality of printheads, each optical density being identified from image data of the test pattern on the image receiving member surface that were received from the optical sensor.

BRIEF DESCRIPTION OF THE DRAWINGS

The foregoing aspects and other features of a printer, which is configured to adjust printhead operation for uniform color imaging between multiple printheads in the printer, are described in connection with the accompanying drawings.

DETAILED DESCRIPTION

For a general understanding of the environment for the system and method disclosed herein as well as the details for the system and method, reference is made to the drawings. In the drawings, like reference numerals have been used throughout to designate like elements. As used herein, the term "printer" refers to any device that produces ink images on media, such as printers, copiers, multi-function devices, or the like. As used herein, the term "image receiving member surface" refers to a print medium surface, such as paper, or an intermediate imaging member surface, such as a print drum or endless belt, which holds ink images formed by inkjet printheads until the images are transferred to media. As used herein, the term "process direction" refers to a direction in which an image receiving member moves relative to one or more printheads during an imaging operation. The term "cross-process direction" refers to a direction that is perpendicular to the process direction along the surface of the image receiving member.

When one or more printheads eject ink drops onto an image receiving member surface, a percentage of the image receiving member surface receiving the ink is covered by ink while the remaining portion of the surface is free of ink. The term "coverage area percentage" refers to the percentage of a given area of the image receiving member surface that is covered in ink with 100% coverage meaning the area is fully covered in ink and 0% coverage meaning the area is free of ink. When forming an ink image with a coverage area percentage of less than 100%, a printer dithers the ink drops to form an image with the predetermined coverage area percentage. As used herein, the term "dither" refers to an operation for ejecting ink drops in a pattern that interleaves with blank portions of the image receiving member surface. A common example of a dithered pattern is a "haltoned" or "checkerboard" pattern where ink drops are placed on the image surface as alternating pixels that are interleaved with blank areas. Various dither patterns can be used to generate images with different coverage area percentages.

The term "optical density" refers to a color density that corresponds to a measurement of light reflected from the image receiving member surface and ink formed on the image receiving member surface. An optical density is a color density measurement inversely related to the intensity of light reflected by a portion of an imaging surface on which a particular color of ink has been ejected at a particular coverage area percentage. The optical density is inversely related because the bare imaging surface reflects more light than a portion of the imaging surface onto which ink has been ejected. Additionally, different colors of ink reflect ink differently so an optical density for light reflected by one color of ink is different than an optical density for light from the same source that is reflected by another color of ink.

As used herein, the term "test pattern" refers to an ink image formed by a predetermined arrangement of ink drops on an image receiving member that enables one or more optical sensors to detect light reflected from the test pattern for the purposes of printhead adjustment. One example of a test pattern is a rectangular area formed by operating each inkjet in a single printhead to eject a predetermined number of ink drops onto an image receiving member surface. Various other test patterns include dashes and geometric patterns formed by one or more inkjets on the image receiving member surface.

As used herein, the term "printhead" refers to a group of inkjet ejectors arranged in fixed physical relationship to one another. The term "print bar" as used in this document refers to a linear arrangement of printheads that are configured for linearly movement as a group. The printhead group collectively referred to as a print bar is operatively connected to an actuator to enable the movement of the entire group in the cross-process direction. Some or all of the printheads in a print bar may be operatively connected to actuators that enable the printheads to move in a cross-process direction independently with respect to the other printheads in the print bar. In a staggered print bar arrangement, printheads are arranged in two groups or print bars that are positioned relative to one another in a staggered pattern. The staggered configuration enables the printheads on the two print bars to emit ink drops in a continuous line across an image receiving member in the cross-process direction. Two or more print bars with printheads in the staggered arrangement are referred to as a "print bar array."

Some printing systems include print bar arrays with printheads that are configured to emit drops of a single color of ink. In one embodiment described below, a first print bar array enables ink printing at a resolution of 300 dots per linear inch (DPI) in the cross-process direction while a second print bar array has an offset with respect to the inkjet ejectors of the first print bar that is one half of the distance between inkjet ejectors and also prints at 300 DPI in the cross-process direction. In combination, the two print bar arrays print a line of pixels with a resolution of 600 DPI in the cross-process direction.

Any arrangement of printheads that is configured to print ink having a single color across the width of the image receiving member may be referred to as a "color station." A color station can include one or more sets of printheads arranged on print bars as described above. Multi-color printers can arrange a plurality of color stations along a portion of a media path known as a "print zone." As an image receiving member surface passes through the print zone, ink drops from different color stations form images on the surface.

Figure 1:
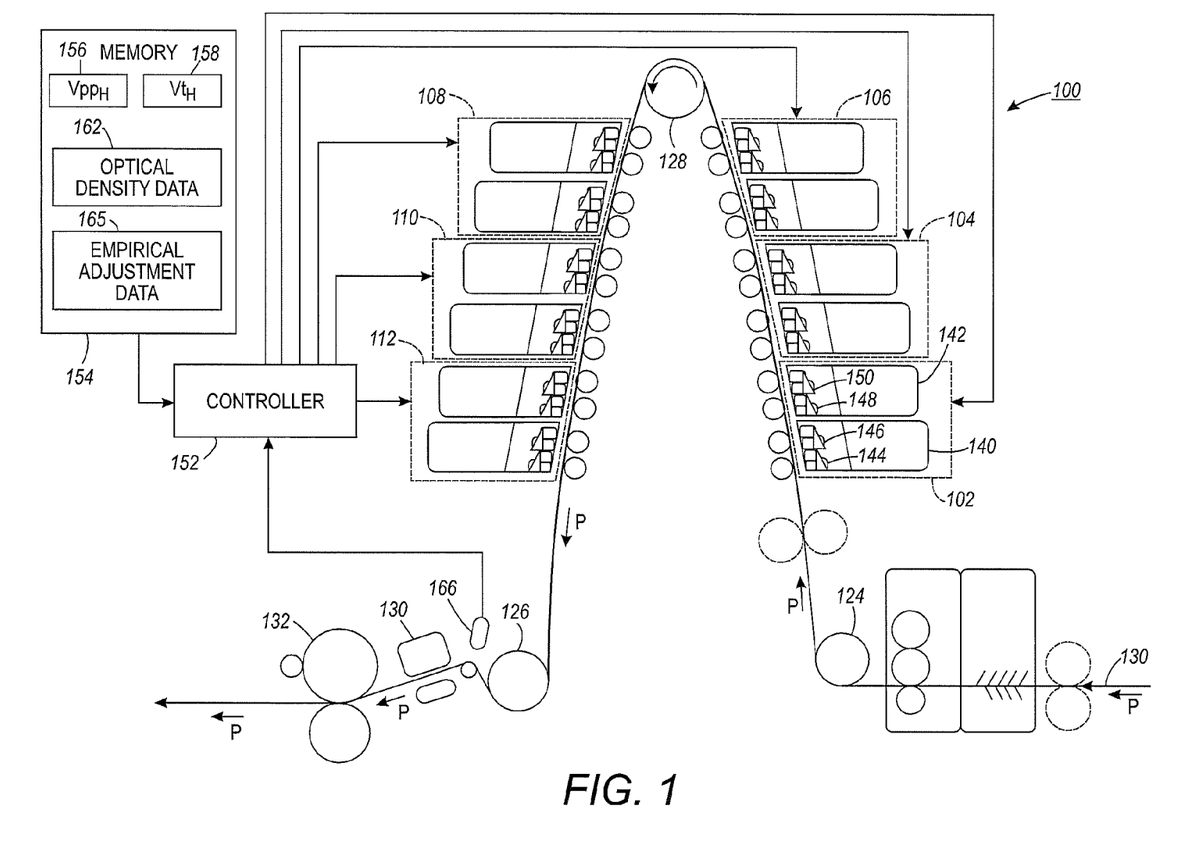
FIG. 1 is a schematic diagram of a printing system, which is configured to adjust ink ejectors in multiple printheads to compensate for changes in the ink drop mass ejected by the printheads.

FIG. 1 depicts a continuous web printer 100 that includes six print modules 102, 104, 106, 108, 110, and 112; a media path P configured to accept a print medium 114, a controller 152, a memory 154, and an image on web array (IOWA) sensor 166. The printer 100 is configured to transport the print medium 114 along the media path P using various rollers including rollers 124, 126, and 128. The print modules 102, 104, 106, 108, 110, and 112 are positioned sequentially along a media path P and form a print zone for forming ink images on a print medium 114 as the print medium 114 travels past the print modules. A heater 130 and a spreader 132 are located at the opposite end 136 of the media path P after the print medium exits the print zone.

In printer 100, each print module 102, 104, 106, 108, 110, and 112 in this embodiment provides an ink of a different color. In the example of FIG. 1, print modules 102, 104, 106, and 108 are configured to emit ink drops having cyan, magenta, yellow, and black colors, respectively. The print modules 110 and 112 are configured to emit ink drops of various colors referred to as "spot colors" that can be used for specific print jobs. Alternative printers are configured with more or fewer print modules for printing processes having various colors, including monochromatic printing. Except for ejecting ink drops having different colors, print modules 102, 104, 106, 108, 110, and 112 are substantially identical. By way of example, print module 102 includes two print sub-modules 140 and 142. Print sub-module 140 includes two print units 144 and 146. The print units 144 and 146 each include an array of printheads that may be arranged in a staggered configuration across the width of both the first section of web media and second section of web media. In a typical embodiment, print unit 144 has four printheads and print unit 146 has three printheads. The printheads in print units 144 and 146 are positioned in a known staggered arrangement to enable the printheads in both units to emit ink drops in a continuous line across the width of media path P at a predetermined resolution. Print module 102 also includes sub-module 142 that includes print units 148 and 150 in the same configuration as sub-module 140, but has a cross-process alignment that differs from sub-module 140 by one-half of a pixel. This arrangement enables printer 100 to print with twice the resolution as provided by a single print sub-module. In the example of FIG. 1, sub-modules 140 and 142 enable the printing system 100 to emit ink drops with a resolution of 600 dots per inch.

Controller 152 is configured to operate and monitor various subsystems, components, and functions of the printer 100. The controller 152 can be implemented with general or specialized programmable processors that execute programmed instructions. Controller 152 is operatively connected to memory 154 to enable the controller 152 to read instructions and read and write data required to perform the programmed functions in memory 154. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

Controller 152 is operatively connected to the print modules 102-112 and controls the timing of ink drop ejection from the print modules 102-112 onto the media web 114. Controller 152 is further operatively connected to the IOWA sensor 166 prior to the media web 114 reaching the spreader roll 132. The spreader roll 132 applies a combination of heat and pressure to the ink drops on the media web 114. The ink drops flatten and spread on the media web 114 to form finished ink images. During the spreading process, ink drops that are located in close proximity to one another on the media web 114 typically merge together to form a continuous area of ink on the media web 114.

The IOWA sensor 166 is a full width image sensor, which monitors the ink on the web 114 as the web 114 passes under the IOWA sensor 166. In the embodiment of FIG. 1, IOWA sensor 166 extends across a width of the print medium 114 in the cross-process direction. IOWA sensor 166 is configured to measure an amount of light reflected from pixel locations across the surface of web 114 and generate signals corresponding to the amount of reflected light detected. The IOWA sensor 166 includes a plurality of photodetectors that are configured to detect light reflected from pixels on the print medium 114 corresponding to a single ink ejector in each of the print modules 102-112. In one embodiment where the media web 114 is white paper and the print modules 102-112 emit inks having various colors, light reflected from ink on the media web 114 is at a lower level than light reflected from bare portions of the media web 114. The IOWA sensor 166 is operatively connected to the controller 152. In the embodiment of FIG. 1, the controller 152 identifies optical densities corresponding to one or more ink ejectors using the signals generated by the IOWA sensor 166.

Figure 5:
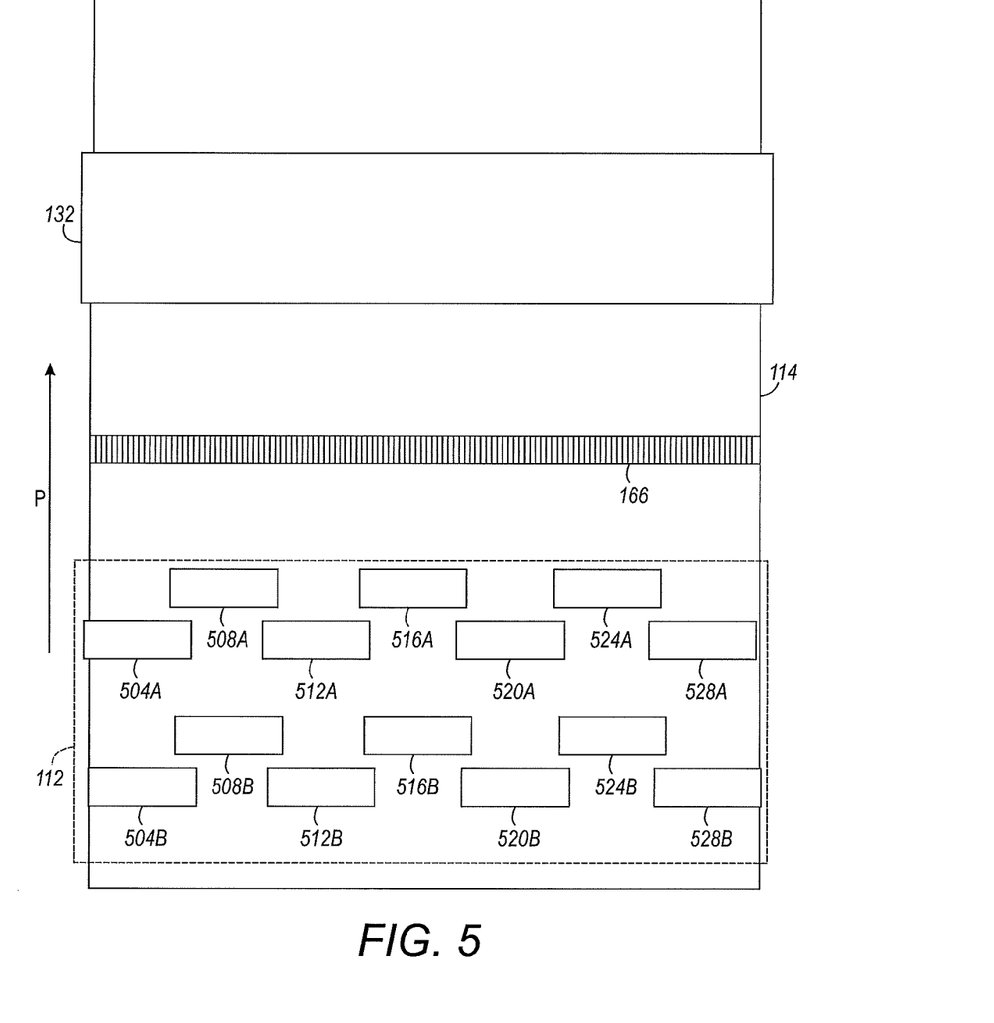
FIG. 5 is a schematic view of a portion of the printing system of FIG. 1.

FIG. 5 depicts the configuration of print module 112, IOWA sensor 166, and spreader roller 132 of the printer 100 in more detail. Print module 112 includes two sets of staggered printheads 504A-528A and 504B-528B. Each of the printheads includes a plurality of ink ejectors that are configured to eject ink drops onto the media web 114 as the media web moves in the process direction P. The other print modules 102-110 have substantially the same configuration. The IOWA sensor 166 is positioned after the print module 112 in the process direction P extends across the media web 114 in the cross-process direction. The IOWA sensor 166 includes a plurality of photodetectors, each of which is configured to detect an amount of lights reflected by a portion of the imaging surface onto which individual inkjets in each of the printheads 504A-528A and 504B-528B have ejected ink.

Figure 4:
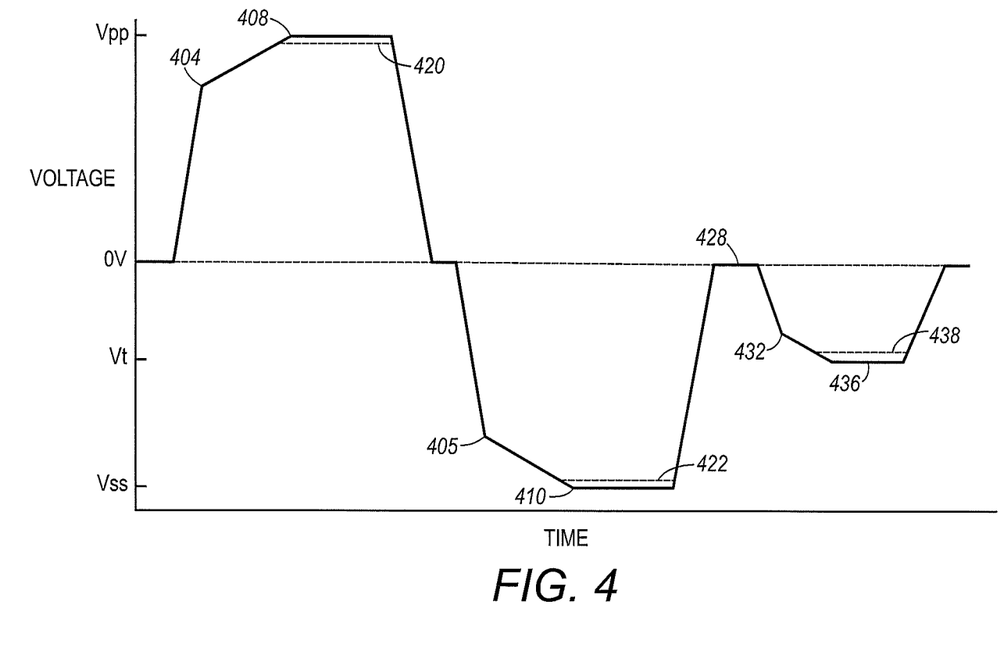
FIG. 4 is a diagram of an exemplary electrical signal that is used to operate an ejector to eject an ink drop.

In operation, the controller 152 downloads firing signal parameters stored in the memory 154 to the printhead controllers that operate the print units 102-112. Thereafter, controller 152 generates a plurality of electrical control signals that are delivered to the printhead controllers. In response, the printhead controller for each of the print units generates firing signals for the actuators in the printheads in the print unit with reference to the firing signal parameters downloaded to each printhead controller. Each generated firing signal operates an actuator in a single inkjet ejector to eject an ink drop onto the image receiving member. FIG. 4 depicts a waveform for the firing signals that the printhead controller generates to operate inkjets in a printhead. The voltage of the signal increases at a first rate to a first inflection voltage 404, and then increases at a lower rate to a peak voltage $V_{pp}$ 408. The firing signal remains at the peak voltage for a predetermined time period before changing to a negative voltage with a negative voltage inflection voltage 406, and a negative peak voltage 410. In FIG. 4, the waveform for the peak voltage $V_{pp}$ and negative peak voltage $V_{ss}$ can have substantially identical magnitudes and waveform shapes with different polarities. The change in voltage between $V_{pp}$ and $V_{ss}$ is referred to as a "peak-to-peak" portion of the electrical signal. After generating the $V_{ss}$ voltage for the predetermined time period, the waveform returns to zero voltage 428 and then drops a second time to an inflection point 432 and tail voltage $V_t$ 436. The magnitude of the tail voltage is less than the magnitude of the peak voltages $V_{pp}$ and $V_{ss}$ and the polarity of the tail voltage can be either positive or negative. In an exemplary embodiment, the magnitudes for $V_{pp}$ and $V_{ss}$ are in a range of approximately 30 to 50 volts and the magnitude of $V_t$ is between approximately 10 and 20 volts, although alternative ink ejector configurations operate with various voltage levels.

In the printer 100, the values of $V_{pp}$, $V_{ss}$, and $V_t$ are configurable on a per-printhead basis. Thus, the firing signals generated for each inkjet ejector in a single printhead share a single $V_{pp}$, $V_{ss}$, and $V_t$ value. As described below, the printer 100 adjusts different printheads with various values of $V_{pp}$, $V_{ss}$, and $V_t$ to enable the printheads to form ink patterns with uniform optical densities. Within each printhead, individual inkjets may emit ink drops having different masses that result in variations in the optical density of ink emitted from a single printhead. The controller 152 is further configured to adjust the relative values of $V_{pp}$, $V_{ss}$, and $V_t$ for one or more of the individual inkjets in each printhead. The controller 152 selects a relative reduction in the value of $V_{pp}$ from the predetermined value of $V_{pp}$ and $V_{ss}$ selected for the printhead. In the printer 100, the magnitude of the reduction can range from zero volts up to a value corresponding to the voltage difference between $V_{pp}$ 408 and the inflection voltage value 404. The same relative reduction is applied to the $V_{ss}$ portion of the waveform. The controller 152 is configured to apply another relative reduction in magnitude to $V_t$ with the magnitude of the voltage reduction ranging from zero volts up to a value corresponding to the voltage difference between $V_t$ 436 and the tail inflection voltage 432. In another embodiment, the reduction in $V_{pp}$ and $V_{ss}$ is achieved by adjusting the predetermined time that the two voltages are applied to an actuator. For example, increasing the amount of time the $V_{pp}$ and $V_{ss}$ voltages are applied for a particular area coverage level enables the actuator to eject more ink mass than the actuator did before the adjustment.

In the printer 100, the relative adjustment to the voltages in firing signals for individual inkjets always reduces the magnitude of a firing signal from the values of $V_{pp}$, $V_{ss}$, and $V_t$ for the printhead. That is, $V_{pp}$, $V_{ss}$, and $V_t$ are parameters selected for a printhead at the maximum voltage magnitudes for firing signals that operate inkjets at a particular coverage level and individual ink ejectors within the printhead operate at these voltages or voltages smaller than these voltages. The $V_{pp}$, $V_{ss}$, and $V_t$ voltages are the current maximum voltage magnitudes for the printhead, but these voltages are not necessarily at the maximum possible voltage for the range in which these voltages can be. As seen in FIG. 4, voltages 420 and 422 represent an adjusted peak voltage amplitude for a single printhead. Similarly, the tail voltage value $V_t$ represents a maximum amplitude magnitude of the tail voltage 436, and individual inkjets may be configured to operate with a smaller peak to peak magnitude or a smaller tail voltage magnitude, such as tail voltage 438. Other printhead parameters include a length of time for applying the firing signal or a frequency at which the signal is applied.

Figure 2A:
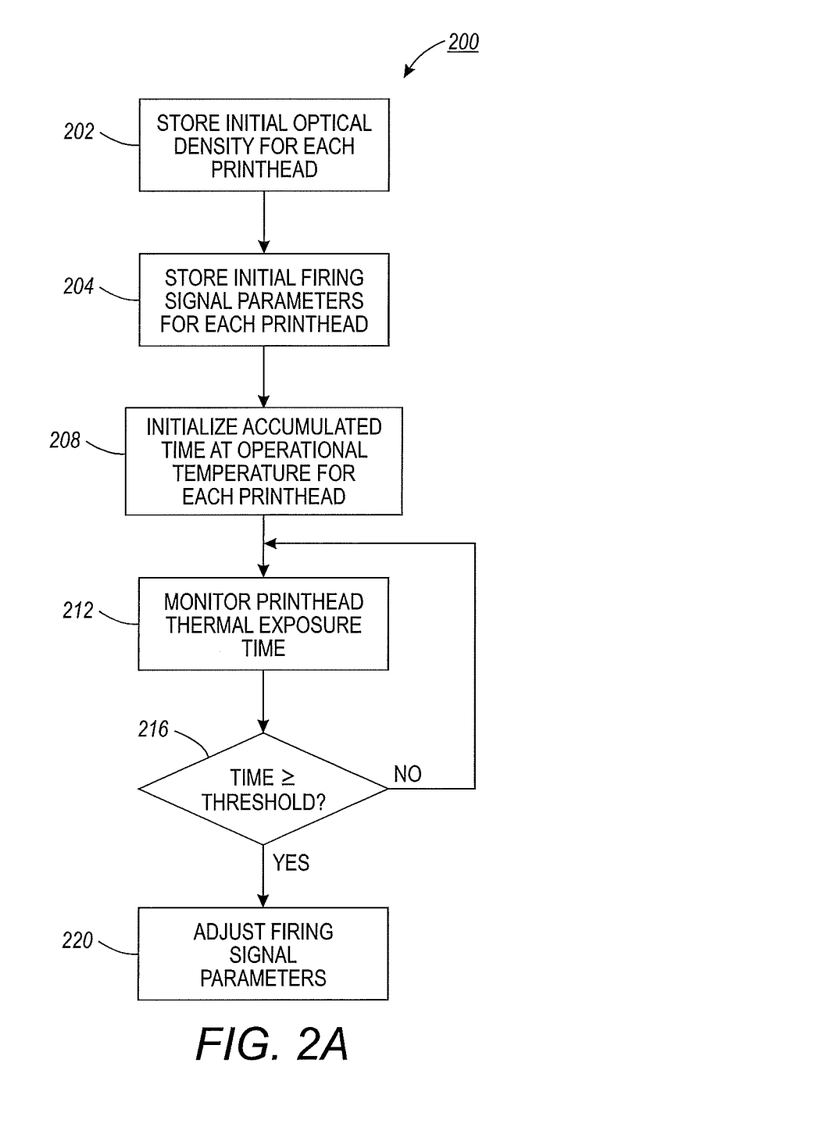
FIG. 2A is a block diagram of a process for detecting a need to adjust operation of multiple printheads in an inkjet printer.

FIG. 2A depicts an iterative process 200 for adjusting the electrical signals used to operate multiple printheads that are configured to eject ink drops of a single color of ink. The printer 100 is configured to perform process 200 for each of the print modules 102-112 and is referenced by way of example. In the description of the various processes below, statements that a process performs some function or implements some action refers to a processor executing programmed instructions stored in a memory to operate one or more operatively connected components to perform the function or implement the action. Process 200 begins by storing an optical intensity for the ink ejected by each printhead in the memory 154 of the printer 100 (block 202) and the firing signal parameters $V_{pp}$, $V_{ss}$, and $V_t$ values for each of the printheads in the memory 154 (block 204). These values were determined by a calibration process at the factory or by an initial startup process performed by the printer at the initiation of its operation. These values enable the printheads to eject ink at an appropriate ink drop mass at each coverage area percentage. An accumulated variation parameter, for example, an accumulated time of exposure to operational temperature, for the printheads ejecting a particular color is also set to an initial value (block 208). In some embodiments this initial value is zero and in other embodiments the initial value is some amount that corresponds to the time the printheads have been exposed to operational temperatures during printer startup procedures. The process then begins to accumulate measurements of the variation parameter, such as the exposure time noted above, for the printheads ejecting the same color as the printer commences operation (block 212) and compares the accumulated variation parameter to a threshold to determine whether firing signal parameters for the printheads ejecting the same color should be adjusted (block 216). If the threshold is met or exceeded, a process for adjusting printhead parameters is performed (block 220). Otherwise, the accumulated variation parameter continues to be accumulated and checked.

Figure 2B:
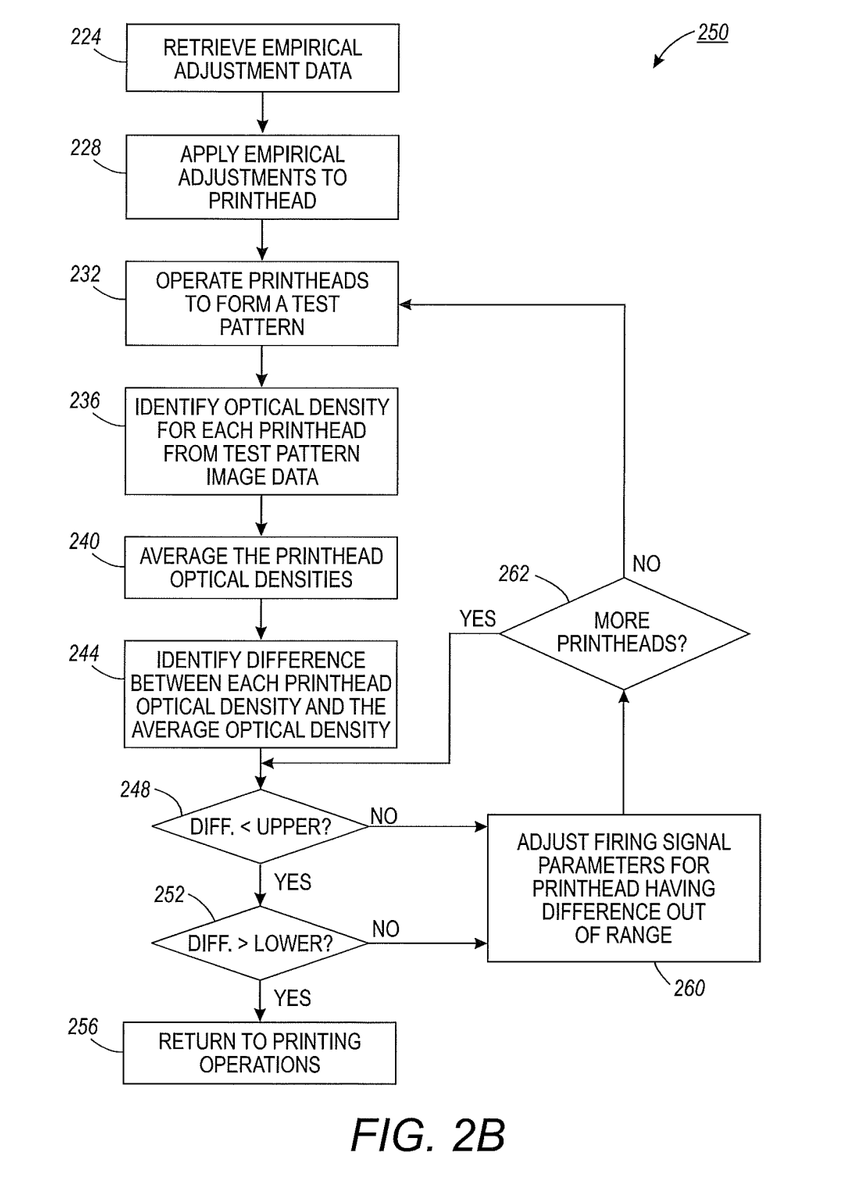
FIG. 2B is a block diagram of a process for adjusting multiple printheads to maintain uniform optical density.

A process for adjusting printhead parameters is shown in FIG. 2B. That process 250 begins by obtaining from memory 154 empirical data 165 having firing signal parameter adjustments that are correlated to an accumulated variation parameter, such as exposure time amounts (block 224). As used in this document, the words "correlate" or "correlating" refer to any mathematical operation that identifies a relationship between one or more measureable parameters and another measureable parameter or parameters. Also, as used in this document, the word "parameter" refers to a measureable physical property of a component, such as an amount of ink ejected by an ejector or printhead, a characteristic of a signal, such as an electrical signal amplitude or frequency, or the like. The process selects the firing signal parameters adjustments corresponding to the accumulated variation parameter meeting or exceeding the threshold and applies those adjustments to the printheads ejecting the same color (block 228). As noted above, this type of open loop adjustment of printheads is previously known and may overcompensate or under-compensate for the changes in the performance of the actuators in the printheads. Consequently, the process of FIG. 2B continues with a closed loop process that enables further adjustment of the firing signals for the individual printheads in the group of printheads ejecting the same color.

In one embodiment, the closed loop portion of process 250 begins with the printer controller operating the printheads ejecting the same color to form a test pattern that is suitable for use with the IOWA 166 (block 232). The controller selects test patterns that have either a high coverage area percentage or low coverage area percentage. The high coverage area percentage is typically above 90% ink coverage, with one configuration of printer 100 using a value of 100% ink coverage. In printer 100, the high coverage area percentage test patterns are used to adjust the tail voltage $V_t$ for each printhead in the group of printheads. The low coverage area percentage is typically less than 35% ink coverage, with one configuration of the printer 100 using a value of 25% ink coverage. In printer 100, the low coverage area percentage test patterns are used to adjust the peak voltages $V_{pp}$ and $V_{ss}$.

Once the test pattern is printed on the image receiving member surface, the processor implementing process 250 receives the digital image data of the test pattern on the image receiving member surface from the IOWA sensor and identifies the average optical density of the ink drops in the test pattern ejected from each printhead (block 236). As used in this document, "average" or "averaging" refers to any mathematical operation applied to a plurality of input data that produces an output datum reasonably related, interpretable as, or approximating an average, including a weighted average or a rolling average. In printer 100, the IOWA sensor generates digital values corresponding to the intensity of the reflected light received by each detector in the IOWA sensor 166 and the controller 152 averages the reflected light intensities for each printhead to generate an average reflected light intensity for each printhead. Each average reflected light intensity for each printhead is correlated to an optical density for the color of ink ejected by each printhead that formed the test pattern. In some embodiments, the average light intensity is a mean average of the light intensities. In other embodiments, the average is a weighted average. A weighted average can be an average of the intensities after the highest and the lowest intensities are removed from the calculation. Other weighting schemes for identifying a printhead can be used as well.

Process 250 continues by identifying an average optical density from all of the printhead average optical densities (block 240). Again, this average can be a weighted average, such as an average of the individual printhead averages after the highest and the lowest average printhead averages are removed from the calculation. Other weighting schemes can be used, such as weighting the average(s) for one or more most recently installed printheads more heavily than the averages for printheads that have been in the printer for a longer period of time.

The difference between the average optical density for each printhead and the identified average for all of the printheads is then identified (block 244) and compared to an upper (block 248) and a lower threshold (block 252) about the optical density average for all of the printheads. If the average optical density for a printhead is in the range between the upper threshold and the lower threshold of the range, then no further adjustment to the firing signals for the printhead are made and the printing operations resume (block 256). If the average optical density for a printhead is outside of the range about the average optical density for all of the printheads, then an adjustment is made to the firing signal parameters (block 260). The adjustment made to the firing signal parameters is made to bring the optical density for the printhead within the range about the average optical density. Thus, for a printhead having an average optical density above the optical density range, the adjustment changes one or more firing signal parameters for the printhead to reduce the mass of the ink ejected by the ejectors in the printhead and vice versa for printheads having an optical density below the range. Once the firing signal parameters for all of the printheads having an average optical density outside of the range about the average optical density for all of the printheads are adjusted (block 262), process 250 is repeated (block 232) until no printheads have an average optical density outside of the range about the average optical density for all of the printheads.

Figure 3:
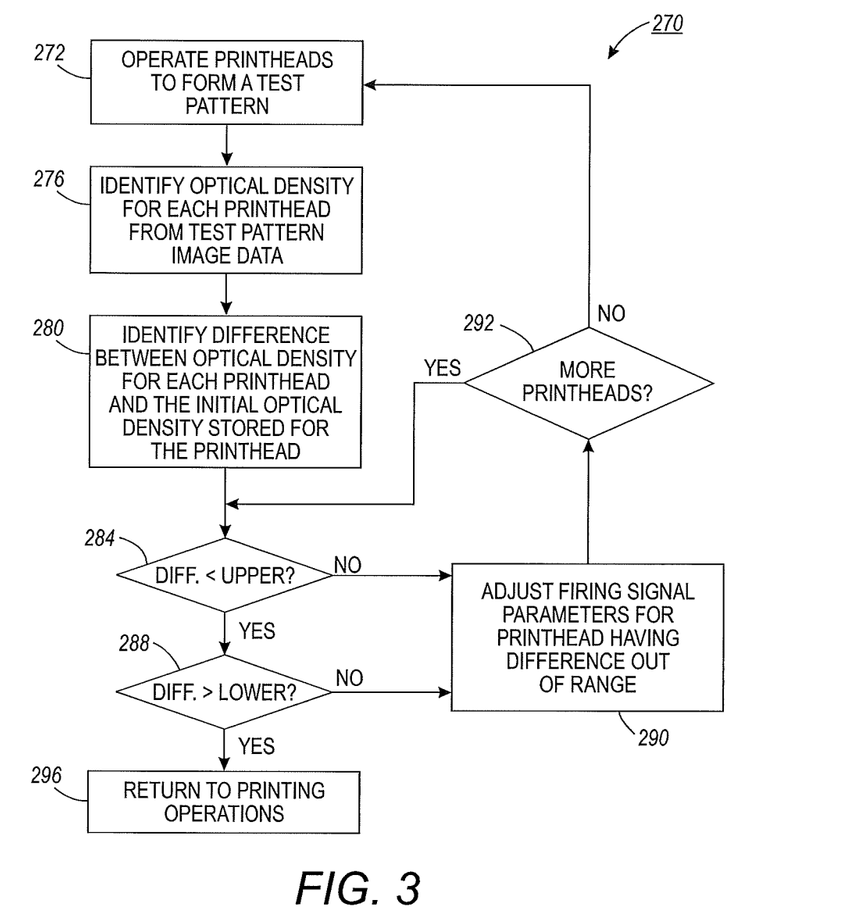
FIG. 3 is a block diagram of a process for adjusting multiple printheads to maintain uniform optical density.

In an alternative embodiment, the closed loop portion of process 250 is implemented with the process 270 shown in FIG. 3. The printer controller also operates the printheads printing the same color of ink to form a test pattern that is suitable for use with the IOWA 166 (block 272). Process 270 also selects test patterns that have either a high coverage area percentage or low coverage area percentage as noted above. Once the test pattern is printed on the image receiving member surface, the processor implementing process 270 receives the digital image data of the test pattern on the image receiving surface and identifies the average optical density of the ink drops in the test pattern ejected from each printhead (block 276). Again, this average can be identified with a weighted averaging scheme. Process 270 then identifies a difference between the average optical density for each printhead and the optical density that had been stored in the optical density data 162 of memory 154 for the printhead at the initiation of printer operation (block 280). This difference is compared to an upper (block 284) and a lower threshold (block 288) about the initial optical density for the printhead. If the average optical density for a printhead is in the range between the upper threshold and the lower threshold of the range about the initial optical density, then no further adjustment to the firing signals for the printhead is necessary as the printhead has been restored to ejecting an ink mass that enabled uniform printing of the ink color and the printing operations resume (block 290). If the average optical density for a printhead is outside of the range about the initial optical density, then an adjustment is made to the firing signal parameters (block 292). The adjustment made to the firing signal parameters is made to bring the average optical density for the printhead within the range about the initial optical density. Once the firing signal parameters are adjusted for all of the printheads having an average optical density outside of the range about the initial optical density for the corresponding printhead (block 296), process 270 is repeated (block 272) until no printheads have an average optical density outside of the range about the initial optical density for the corresponding printhead.

In other embodiments, the initial optical density for each printhead that ejects ink of a particular color is updated to the initial optical density identified by the controller in the printer for a newly installed printhead ejecting that color of ink. The newly installed printhead is typically replacing another printhead that cannot be adjusted to match the identified average of all of the printheads accurately. This updating of the initial density is done because newer printheads have not suffered drift as have the other printheads so this updating helps ensure that the average optical density does not shift to far from its initial value. Within these embodiments, the initial optical density for each printhead can be updated with a weighted average for all of the printheads with the average optical densities for the printheads being more heavily weighted towards the newer printheads.

In the descriptions of firing signal adjustments presented above, the portion of the electrical firing signal for a printhead that is adjusted is selected based on the coverage area percentage of the test pattern. The values of $V_{pp}$ and $V_{ss}$ are adjusted in response to the optical density of the low coverage area percentage test pattern being identified, and the value of $V_t$ is adjusted when the optical density of the high coverage area percentage test pattern is identified. Printer 100 implements a proportional-integral (PI) control system to select a new electrical signal voltage based on the measured difference between the optical density of the portion of the test pattern formed by a printhead and the optical density used as a reference, which is either an average optical density for all of the printheads or the initial optical density for a printhead.

The in situ method and the system of firing signal adjustment are well-suited for use in printers that use phase change inks. Phase change inks require heated printheads to maintain the ink in a liquid phase and the ink needs to be fixed to media with a spreader to produce the best quality image. Over the life of a heated printhead, the inkjet ejectors eject drops that have less mass than the ink drops ejected earlier in the life of the printheads. Consequently, the optical density of the colored ejected ink produced by the heated printheads changes over the life of the phase change imaging system and needs to be evaluated and adjusted in situ to ensure proper image quality. In order to provide data regarding the placement of ink drops ejected by printheads in a solid ink or phase change ink printer, the image on web array (IOWA) optical system is positioned prior to the spreader so individual ink drops can be imaged and the positional data of the image data corresponding to the drops analyzed to evaluate inkjet ejector performance in the printheads.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for calibrating ink ejectors in a plurality of printheads in a printer comprising:
   adjusting with reference to empirically determined data at least one firing signal parameter for each printhead in a plurality of printheads, each printhead in the plurality of printheads ejecting a first color of ink only; and
   further adjusting the at least one firing signal parameter with reference to an optical density identified for each printhead in the plurality of printheads, each optical density being identified from image data of a test pattern formed on an image receiving member surface by the printheads in the plurality of printheads after the adjustment of the at least one firing signal parameter was made with reference to the empirically determined data.

2. The method of claim 1 wherein the test pattern has a predetermined coverage area percentage that is greater than ninety percent and the at least one firing signal parameter is a tail portion parameter.

3. The method of claim 1 wherein the test pattern has a predetermined coverage area percentage that is less than thirty-five percent and the at least one firing signal parameter is a peak-to-peak parameter.

4. The method of claim 1, the identification of the optical density for a printhead further comprising:
   averaging reflected light intensities corresponding to the printhead that were obtained from the image data of the test pattern; and
   correlating the average reflected light intensity to an optical density.

5. The method of claim 4, the averaging of the light intensities further comprising:
   performing a weighted average of the reflected light intensities.

6. The method of claim 1 further comprising:
   averaging the optical densities for the printheads in the plurality of printheads;
   comparing the optical density for each printhead in the plurality of printheads to the average optical density for the plurality of printheads; and
   further adjusting the at least one firing signal parameter for each printhead in the plurality of printheads having an optical density that is outside a range of optical densities about the average optical density for the plurality of printheads.

7. The method of claim 6, the averaging of the optical densities further comprising:
   performing a weighted average of the optical densities.

8. The method of claim 6 further comprising:
   operating the plurality of printheads to generate another test pattern on an image receiving member surface after the further adjustment of the printheads;
   averaging the optical densities identified for the printheads in the plurality of printheads with reference to the image data of the other test pattern;
   comparing the optical density for each printhead identified with reference to the other test pattern to the average optical density for the plurality of printheads;
   further adjusting the at least one firing signal parameter for each printhead having an optical density identified with reference to the image data of the other test pattern that is outside a range of optical densities about the average optical density for the plurality of printheads; and
   continuing to operate the plurality of printheads to generate another test pattern and to further adjust the at least one firing signal parameter for each printhead having an optical density outside of the range about the average optical density until each printhead in the plurality of printheads has an optical density within the range about the average optical density.

9. The method of claim 1 further comprising:
   comparing the optical density for each printhead in the plurality of printheads to an initial optical density corresponding to the printhead; and
   further adjusting the at least one firing signal parameter for each printhead in the plurality of printheads having an optical density that is outside a range of optical densities about the initial optical density for the printhead.

10. The method of claim 9 further comprising:
    modifying the initial optical density for the printhead to an optical density corresponding to a printhead installed in the printer after the printhead corresponding to the initial optical density was installed in the printer.

11. The method of claim 9 further comprising:
    operating the plurality of printheads to generate another test pattern on an image receiving member surface after the further adjustment of the printheads;
    identifying an optical density for each printhead in the plurality of printheads with reference to the image data of the other test pattern;
    comparing the optical density for each printhead identified with reference to the other test pattern to the initial optical density for the printhead;
    further adjusting the at least one firing signal parameter for each printhead having an optical density identified with reference to the image data of the other test pattern that is outside a range of optical densities about the optical density for the printhead; and
    continuing to operate the plurality of printheads to generate another test pattern and to further adjust the at least one firing signal parameter for each printhead having an optical density outside of the range about the initial optical density for the printhead until each printhead has an optical density within the range about the initial optical density for the printhead.

12. A printer comprising:
    a media transport configured to move an image receiving member through a print zone in a process direction;

a plurality of heated printheads arranged in the print zone to enable printing with a single color of phase change ink across the image receiving member in a cross-process direction;

an optical sensor located in the process direction from the plurality of heated printheads in the print zone, the optical sensor being configured to generate signals corresponding to light reflected from ink drops ejected onto the image receiving member by the plurality of heated printheads; and a controller operatively connected to the plurality of heated printheads and the optical sensor, the controller being configured to:

adjust with reference to empirically determined data at least one firing signal parameter for each heated printhead in the plurality of heated printheads;

operate the plurality of printheads to form a test pattern on an image receiving member surface after the adjustment of the at least one firing signal parameter was made with reference to the empirically determined data; and further adjusting the at least one firing signal parameter with reference to an optical density identified for each heated printhead in the plurality of printheads, each optical density being identified from image data of the test pattern on the image receiving member surface that were received from the optical sensor.

13. The printer of claim 12, the controller being further configured to:

operate the plurality of heated printheads to form the test pattern with a predetermined coverage area percentage that is greater than ninety percent and the at least one firing signal parameter is a tail portion parameter.

14. The printer of claim 12, the controller being further configured to:

operate the plurality of heated printheads to form the test pattern with a predetermined coverage area percentage that is less than thirty-five percent and the at least one firing signal parameter is a peak-to-peak parameter.

15. The printer of claim 12, the controller being further configured to identify the optical density for a printhead by:

averaging reflected light intensities corresponding to one heated printhead that were obtained from the image data of the test pattern; and correlating the average reflected light intensity to an optical density.

16. The printer of claim 15, the controller being further configured to average the reflected light intensities corresponding to the one heated printhead by weighting the reflected light intensities before averaging the intensities.

17. The printer of claim 12 further comprising:

averaging the optical densities for the printheads in the plurality of heated printheads;

comparing the optical density for each printhead in the plurality of heated printheads to the average optical density for the plurality of heated printheads; and further adjusting the at least one firing signal parameter for each heated printhead in the plurality of heated printheads having an optical density that is outside a range of optical densities about the average optical density for the plurality of heated printheads.

18. The printer of claim 17, the controller being further configured to average the optical densities for the printheads by weighting the optical densities before averaging the intensities.

19. The printer of claim 18, the controller being further configured to weight the optical densities for the printheads with reference to a time each printhead has been installed in the printer.

20. The printer of claim 17, the controller being further configured to:

operate the plurality of heated printheads to generate another test pattern on an image receiving member surface after the further adjustment of the heated printheads;

averaging the optical densities identified for the heated printheads in the plurality of heated printheads with reference to the image data of the other test pattern received from the optical sensor;

comparing the optical density for each printhead identified with reference to the other test pattern to the average optical density for the plurality of heated printheads;

further adjusting the at least one firing signal parameter for each heated printhead having an optical density identified with reference to the image data of the other test pattern that is outside a range of optical densities about the average optical density for the plurality of heated printheads; and continuing to operate the plurality of heated printheads to generate another test pattern and to further adjust the at least one firing signal parameter for each heated printhead having an optical density outside of the range about the average optical density until each heated printhead in the plurality of heated printheads has an optical density within the range about the average optical density.

21. The printer of claim 12, the controller being further configured to:

compare the optical density for each heated printhead in the plurality of heated printheads to an initial optical density corresponding to the heated printhead; and further adjusting the at least one firing signal parameter for each heated printhead in the plurality of heated printheads having an optical density that is outside a range of optical densities about the initial optical density for the heated printhead.

22. The printer of claim 15, the controller being further configured to:

operate the plurality of heated printheads to generate another test pattern on an image receiving member surface after the further adjustment of the heated printheads;

identifying an optical density for each heated printhead in the plurality of heated printheads with reference to the image data of the other test pattern;

comparing the optical density for each heated printhead identified with reference to the other test pattern to the initial optical density for the heated printhead;

further adjusting the at least one firing signal parameter for each heated printhead having an optical density identified with reference to the image data of the other test pattern that is outside a range of optical densities about the optical density for the heated printhead; and continuing to operate the plurality of heated printheads to generate another test pattern and to further adjust the at least one firing signal parameter for each heated printhead having an optical density outside of the range about the initial optical density for the heated printhead until each heated printhead has an optical density within the range about the initial optical density for the heated printhead.

23. The printer of claim 21, the controller being further configured to:

modifying the initial optical density for a printhead to an optical density corresponding to a printhead installed in the printer after the printhead corresponding to the initial optical density was installed in the printer.

* * * * *